(12) United States Patent  (10) Patent No.: US 9,026,353 B2
Tashiro  (45) Date of Patent: May 5, 2015

(54) METHOD AND APPARATUS FOR DISPLAYING GUIDANCE FOR NAVIGATION SYSTEM

(75) Inventor: Eric Tashiro, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 717 days.

(21) Appl. No.: 12/713,532

(22) Filed: Feb. 26, 2010

(65) Prior Publication Data

US 2011/0213548 A1    Sep. 1, 2011

(51) Int. Cl.
  *G01C 21/26*    (2006.01)
  *G01C 21/34*    (2006.01)
  *G01C 21/36*    (2006.01)

(52) U.S. Cl.
  CPC .................................. *G01C 21/3658* (2013.01)

(58) Field of Classification Search
  CPC ....................................................... G01C 21/34
  See application file for complete search history.

(56) References Cited

U.S. PATENT DOCUMENTS

| | | | |
|---|---|---|---|
| 5,297,049 A * | 3/1994 | Gurmu et al. | 701/117 |
| 6,278,941 B1 * | 8/2001 | Yokoyama | 701/420 |
| 6,388,582 B2 | 5/2002 | Yamashita et al. | |
| 6,510,386 B2 | 1/2003 | Sakashita | |
| 6,700,505 B2 | 3/2004 | Yamashita et al. | |
| 6,944,538 B2 | 9/2005 | Ishibashi et al. | |
| 7,042,370 B2 | 5/2006 | Morie | |
| 7,127,350 B2 * | 10/2006 | Oikubo | 701/437 |
| 8,756,000 B2 * | 6/2014 | Tertoolen | 701/400 |
| 2007/0124072 A1 | 5/2007 | Nakayama et al. | |
| 2007/0225907 A1 | 9/2007 | Oonishi et al. | |
| 2008/0249710 A1 * | 10/2008 | Takada | 701/209 |
| 2009/0112462 A1 * | 4/2009 | Lo | 701/209 |
| 2009/0222202 A1 | 9/2009 | Kato | |
| 2010/0138148 A1 * | 6/2010 | Nishibashi et al. | 701/201 |

* cited by examiner

*Primary Examiner* — Ryan Zeender
*Assistant Examiner* — Ariel Yu
(74) *Attorney, Agent, or Firm* — Muramatsu & Associates

(57) ABSTRACT

This invention relates to a display method and apparatus in a navigation system. More specifically, this invention relates to a navigation-based method and apparatus to provide guidance information to a driver without repeatedly performing route recalculation when the driver makes slight deviation from the road he or she is travelling on. In one embodiment of the present invention, guidance information is displayed on a user interface without generating a route. For example, when a vehicle is travelling either on a freeway or a surface road, a distance indicator provides distance information to nearby freeway junctions or streets. In another embodiment, when the vehicle is deviated from a calculated route, a route deviation detecting unit may detect whether the vehicle is deviating from the calculated route to a predetermined extent. If not, the original calculated route will not be recalculated.

21 Claims, 10 Drawing Sheets

METHOD AND APPARATUS FOR DISPLAYING GUIDANCE FOR NAVIGATION SYSTEM

FIELD OF THE INVENTION

This invention relates to a display method and apparatus in a navigation system. More specifically, this invention relates to a navigation-based method and apparatus to provide guidance information to a driver without repeatedly performing route recalculation when the driver makes slight deviation from the road he or she is travelling on.

BACKGROUND OF THE INVENTION

Navigation devices, including portable navigation devices (PNDs), have become more popular and affordable recently for most users. The navigation device can, not only determine the driver's current position by utilizing the Global Positioning System (GPS), but also provide different routing information between the vehicle's current position and the destination. In order to perform abovementioned functions, the navigation device is usually equipped with a sophisticated navigation system comprising navigation computer programs and one or more detailed database to store and provide maps, road networks, geographical features, and waypoint or point-of-interest (POI) information.

More particularly, in a map database, major links such as freeways, highways and streets connecting to major arteries include lane count, lane connectivity, merge and lane expansion, and lane accessibility information. The navigation device is expanding its proximity radius based on the map-matched link as a center point, to traverse all accessible links from the current position and sequence the data of nearest node points. In selecting the appropriate nodes, the navigation device needs to estimate the vehicle directions and prioritize data based on the most probable directions.

A standard automotive navigation system is typically equipped with a routing and guidance feature that provides the user with a turn-by-turn guidance for a route generated between the current vehicle position and the input destination. To generate a route for the driver, the system checks the route link list sequentially to retrieve the necessary maneuver points. More recently, with the advance of the navigation system, a lane guidance feature is employed to assist the driver on the lane basis for streets with multiple lanes and intersections.

The lane guidance feature with a predetermined route provides the driver turn-by-turn guidance on the lane basis, and the system may recalculate the route if the driver does not stay on the lane suggested by the system. For example, if the driver notices that the lane he is traveling on is blocked due to accident, he may want to switch to other lanes to avoid the traffic and the system may recalculate the route for the lane change. Such route recalculation may be unnecessary since the destination remains the same and the system may be overwhelmed.

U.S. Pat. No. 6,944,538 to Ishibashi et al. discloses a navigation system which eases the burden of changing lanes, taking into consideration the traffic situation surrounding the vehicle. More specifically, the navigation system includes an image capturing device, i.e., a camera, for taking images in an area close to the rear of the vehicle, and the lane changing information is provided to the driver according to the images taken in vicinity surrounding the vehicle, as shown in FIG. 1. However, Ishibashi does not disclose anything related to provide a lane guidance system to avoid unnecessary route recalculation when the vehicle does not stay on the lane suggested by the lane guidance navigation system.

U.S. Pat. App. Pub. No. 2009/0222202 discloses a navigation system providing guidance regarding a travel route to a vehicle. More particularly, the navigation system provides more clear guidance when a lane is added to correspond to a road which is taken after a course change, as illustrated in FIG. 2. However, like Ishibashi, it does not disclose anything related to provide a lane guidance system to avoid unnecessary route recalculation when the vehicle does not stay on the lane suggested by the lane guidance navigation system.

U.S. Pat. App. Pub. No. 2007/0124072 discloses a navigation system providing lane guidance to lead the vehicle to the recommended lane. More specifically, the system receives information regarding the vehicle's current position and moving direction to determine whether the vehicle is moving toward the recommended lane. If the vehicle is moving toward the recommended lane, the system provides lane guidance to the vehicle, as shown in FIG. 3. However, it does not disclose anything related to provide a lane guidance system to avoid unnecessary route recalculation when the vehicle does not stay on the lane suggested by the lane guidance navigation system.

Therefore, there remains a need for a new and improved apparatus and method to provide guidance information to the driver without repeatedly performing unnecessary route recalculation when the driver makes slight deviation from the route without changing the destination.

SUMMARY OF THE INVENTION

It is an object of the present invention to provide a guidance display method and apparatus to avoid unnecessary and repetitive route recalculation when a driver makes slight deviation from a calculated route without changing the destination.

It is another object of the present invention to provide guidance information along with street and lane accessibility, intersection conditions and freeway exits.

It is a still another object of the present invention to provide a guidance display method and apparatus configured to observe how the driver maneuvers away from the original route. And in the process of waiting, routeless guidance will be shown to the driver, with the additional information of distance and complexity flags on each guide options icon, in which the factor to determine the complexity includes: freeway junction counts to destination, local street turn counts to destination, local street left turn versus right turn counts, and street and freeway junction counts.

It is a further object of the present invention to provide guidance information along with successive turn lanes and associated turn restrictions.

It is still a further object of the present invention to detect whether the vehicle is deviating from a route to a predetermined extent, and if not, the unnecessary route recalculation can be avoided.

According to one aspect of the present invention, a navigation system comprises a user interface; a vehicle position detecting unit, for example, a global positioning system (GPS), to detect a vehicle's current position; at least one database to store and provide maps and road networks, including lane data; and a guidance providing unit to provide guidance information to a driver on a lane basis. The guidance providing unit is communicatively coupled with the database and vehicle position detecting unit to match the vehicle's current position with the lane data and display such information on the user interface without a route to the destination. In one embodiment, the user interface is a display unit which is configured to display maps, POIs and routing information. In some embodiments, the navigation system may be portable.

The navigation system may include a route generating unit which is adapted to retrieve the map and road network data from the database and generate a calculated route. In an exemplary embodiment in the present invention, the route generating unit is communicatively coupled with the guidance providing unit and if the guidance information is provided to the driver on the user interface, the calculated route may not simultaneously be shown on the user interface.

In one embodiment, the guidance providing unit may include a lane number determining unit to determine the number of lanes according to the lane data stored in the database. In another embodiment, the navigation system may further include a travel lane determining unit to determine which lane the vehicle is traveling on. In a further embodiment, the guidance providing unit may further include a link determining unit to check all accessible road links from the vehicle's current position In another aspect, the present invention provides a guidance display method comprising the steps of: detecting a vehicle's current position; storing maps and road networks, including lane data; providing guidance information to the vehicle driver; and displaying the current position of the vehicle and the guidance information, wherein a user interface displays the guidance information and the vehicle's current position matching with the maps and road networks, without displaying a route to the destination.

In one embodiment, the step of providing guidance information comprises a step of providing guidance information on a lane basis. In another embodiment, the step of providing guidance information comprises a step of providing a distance indicator which shows distance information from the vehicle's current position to nearby freeway junctions or nearby streets.

In some embodiments, the guidance display method may further include a step of generating a route, and the step of detecting a vehicle's current position comprises a step of detecting route deviation of the vehicle to determine whether the vehicle deviates from a route to a predetermined extent, and when the step for detecting route deviation indicates that the vehicle does not deviate from the route to the predetermined extent, the step for generating a route is not triggered to recalculate and generate a new route to the same destination.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a display method and apparatus in a navigation system. More specifically, this invention relates to a navigation-based method and apparatus to provide guidance information to a driver without a route. As stated above, although lane guidance with predetermined route is a useful feature in the navigation system to assist the driver on the lane basis for streets with multiple lanes and intersections, the system may have to recalculate the route whenever the driver makes the lane change, even when the lane change is not intended to deviate from the original route. The navigation system may not be able to work efficiently and may be overwhelmed to perform such unnecessary route recalculation.

Figure 1:
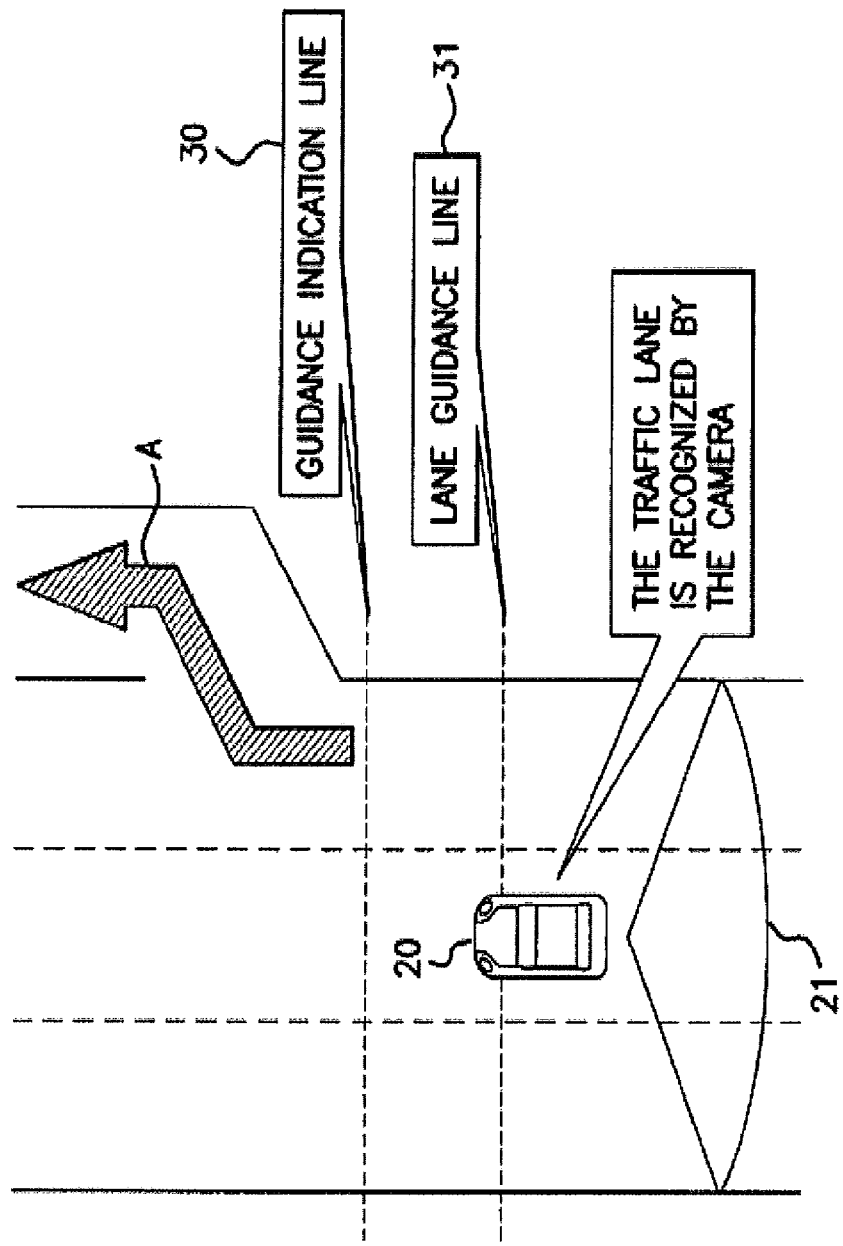
FIG. 1 illustrates a prior art, related to a navigation system which eases the burden of changing lanes, taking into consideration the traffic situation surrounding the vehicle.
Figure 2:
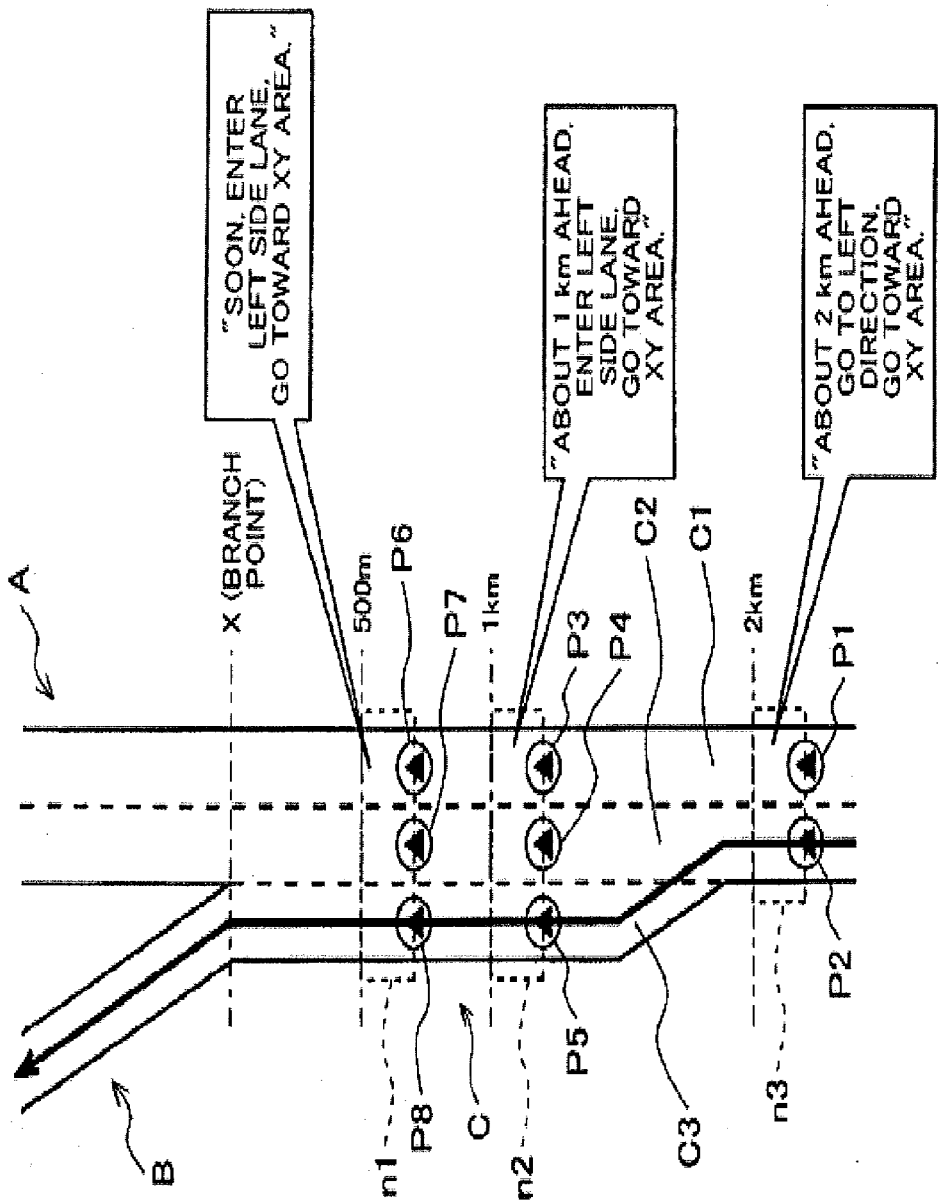
FIG. 2 illustrates a prior art, related to a navigation system providing more clear guidance when a lane is added to correspond to a road which is taken after a course change.
Figure 3:
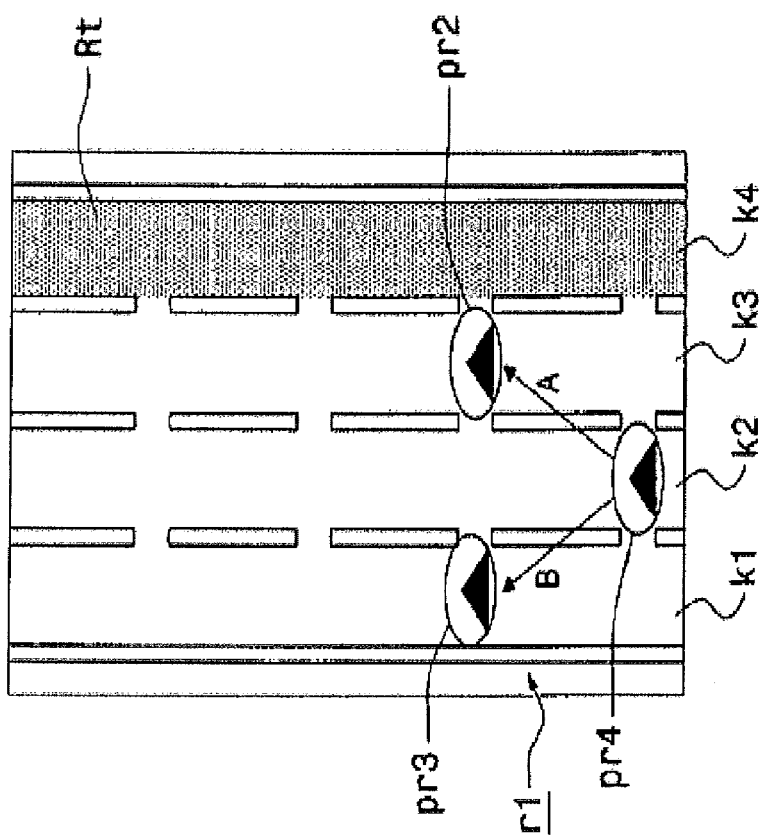
FIG. 3 illustrates a prior art, related to a navigation system providing guidance information to the vehicle when the vehicle is moving toward the direction of the recommended lane.
Figure 4:
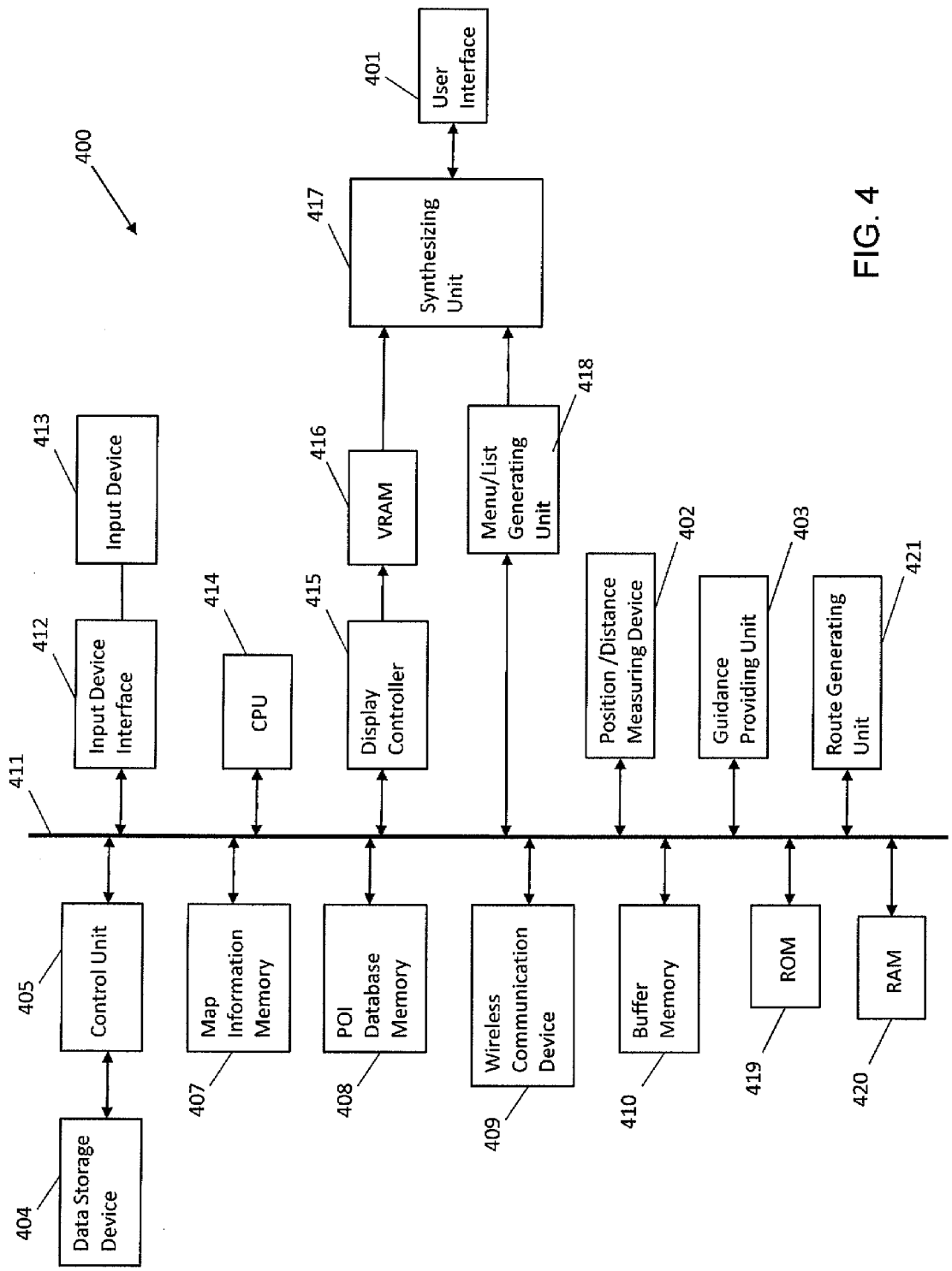
FIG. 4 illustrates a functional block diagram showing an example of structure of a navigation system implementing the method and apparatus to provide guidance information to a driver without generating a route.

FIG. 4 is a block diagram showing an example of structure of a navigation system 400 for implementing the present invention. The navigation system 400 includes a user interface 401; a data storage device 404 such as a hard disc, CD-ROM, DVD or other storage means for storing the map data; and a control unit 405 for controlling an operation for reading the information from the data storage device 404. In one embodiment, the user interface 401 is a display unit which is configured to display maps, POIs and guidance information. In some embodiments, the navigation system 400 may be portable.

The navigation system 400 also includes a position and distance measuring device 402 for measuring the present vehicle position or user position. For example, the position and distance measuring device 402 has a speed sensor for detecting a moving distance, a gyroscope for detecting a moving direction, a microprocessor for calculating a position, a GPS (global positioning system) sensor for detecting the vehicle's current position by receiving radio waves generated by GPS satellites. In one embodiment, the GPS sensor is, for example, used as the current position detection portion, but the speed sensor, a steering sensor, an altimeter or the like can be used individually or in combination instead of the GPS sensor.

As shown in FIG. 4, the navigation system 400 may also include a guidance providing unit 403 to provide guidance information to the driver on a lane basis; a map information memory 407 for storing the map information which is read from data storage 404; a route generating unit 421 adapted to retrieve the map and road network data from the database and generate a calculated route; and a database memory 408 for storing database information such as point of interest (POI) information which is read out from the data storage device 404. In an exemplary embodiment in the present invention, the guidance providing unit 403 is communicatively coupled with the map information memory 407, the route generating unit 421 and the vehicle position detecting unit 402 to match the vehicle's current position with the lane data and display such information on the user interface 401. More specifically, if the guidance information is provided to the driver, the system 400 may instruct the route generating unit 421 not to provide a calculated route in order to avoid unnecessary route recalculation illustrated above.

The block diagram of FIG. 4 further includes an input device 413 for executing a menu selection operation, an enlarge/reduce operation, a destination input operation, . . . etc. and an input device interface 412. In one embodiment, the input device 413 is a remote controller. The navigation system 400 also includes a bus 411 for interfacing the above units in the system, a processor (CPU) 414 for controlling an overall operation of the navigation system 400, a ROM 419 for storing various control programs such as a route search program and a map matching program necessary for navigation control, a RAM 420 for storing a processing result such as a guide route, a display controller 415 for generating map image (a map guide image and an arrow guide image) on the basis of the map information, a VRAM 416 for storing images generated by the display controller 415, a menu/list generating unit 418 for generating menu image/various list images, a synthesizing unit 417, a wireless communication device 409 to retrieve data from a remote server, the Internet or other communication networks, and a buffer memory 410 for temporary storing data for ease of data processing.

Figure 8:
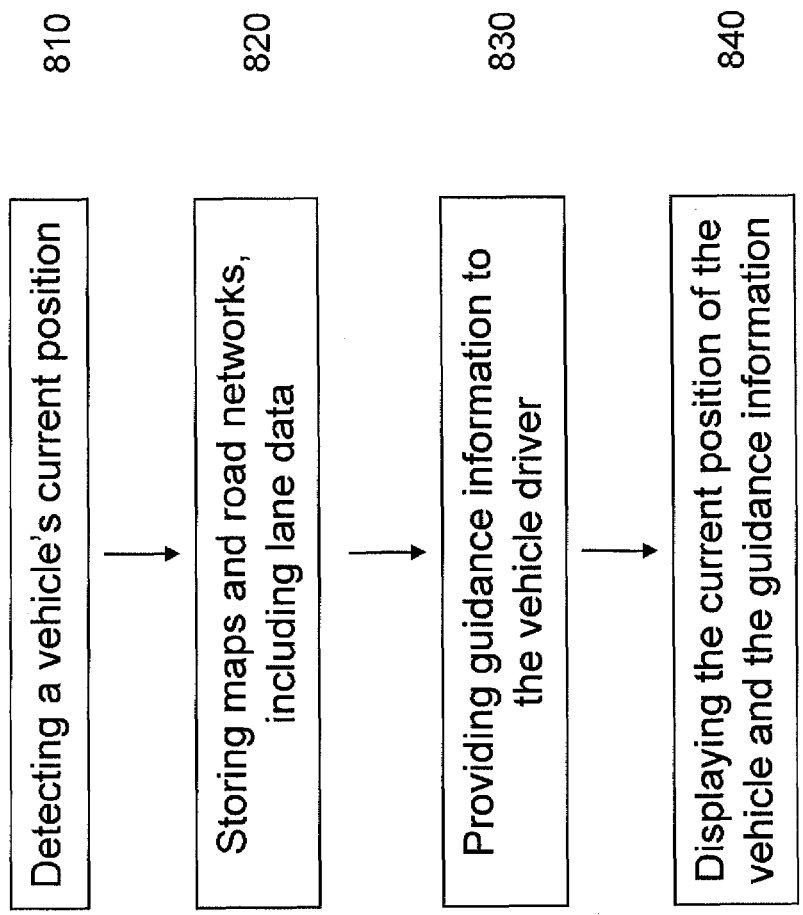
FIG. 8 illustrates another aspect of the present invention, depicting a guidance display method for displaying the vehicle's current position, guidance and map information on a user interface.

A program for conducting the operation of providing routeless guidance information in the present invention shown in the flowchart of FIG. 8 is stored in the ROM 419 or other memory and is executed by the CPU 414. The CPU 414 controls an overall operation of the guidance display method and apparatus in the present invention.

Figure 5:
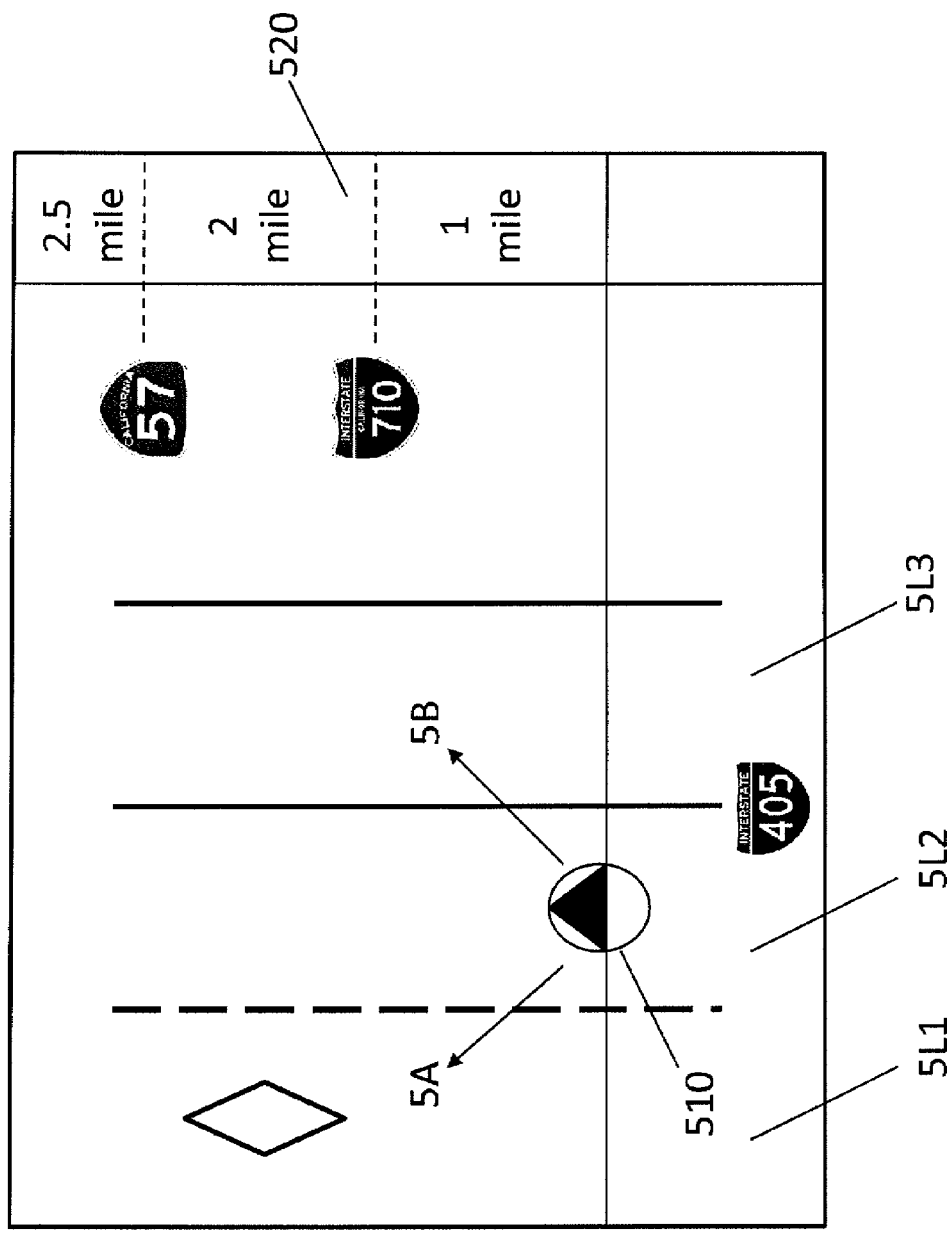
FIG. 5 illustrates one embodiment in the present invention in which when the vehicle makes lane changes on a freeway, the navigation system may not recalculate the route.

In an exemplary embodiment, the guidance system can be implemented when the vehicle is traveling on freeways. As can be seen in FIG. 5, a current position of a vehicle 510 is at lane 5L2 of freeway 405, which has three lanes 5L1, 5L2 and 5L3. A distance indicator 520 on the right side of the user interface provides information about distance from the vehicle's current position to nearby freeway junctions. The distance information may change according to change of the position of the vehicle. For example, from the vehicle's current position, it is one mile away to freeway 710, and two miles away to freeway 57. More particularly, the CPU 414 may detect the vehicle's current position through the position measuring device 402 and retrieve the map data from the map information memory 407 to enable the distance indicator 520 to display the distances.

As stated above, the traditional lane guidance navigation system may recalculate the route whenever the driver makes lane changes. Such unnecessary recalculation may overwhelm the navigation system and may frustrate the user. Thus, in the example of FIG. 5, when the vehicle 510 on 5L2 makes lane changes to either 5L1 (toward direction 5A) or 5L3 (toward direction 5B), the lane guidance system in the present invention may not recalculate the route if the vehicle is still travelling on the same freeway 405. In one embodiment, the position measuring device 402 may be communicatively coupled with the guidance providing unit 403 and the route generating unit 421 through the bus 411, such that when the CPU 414 receives lane change information from the position measuring device 402, the CPU 414 may instruct the route generating unit 421 not to recalculate the route.

Figure 6:
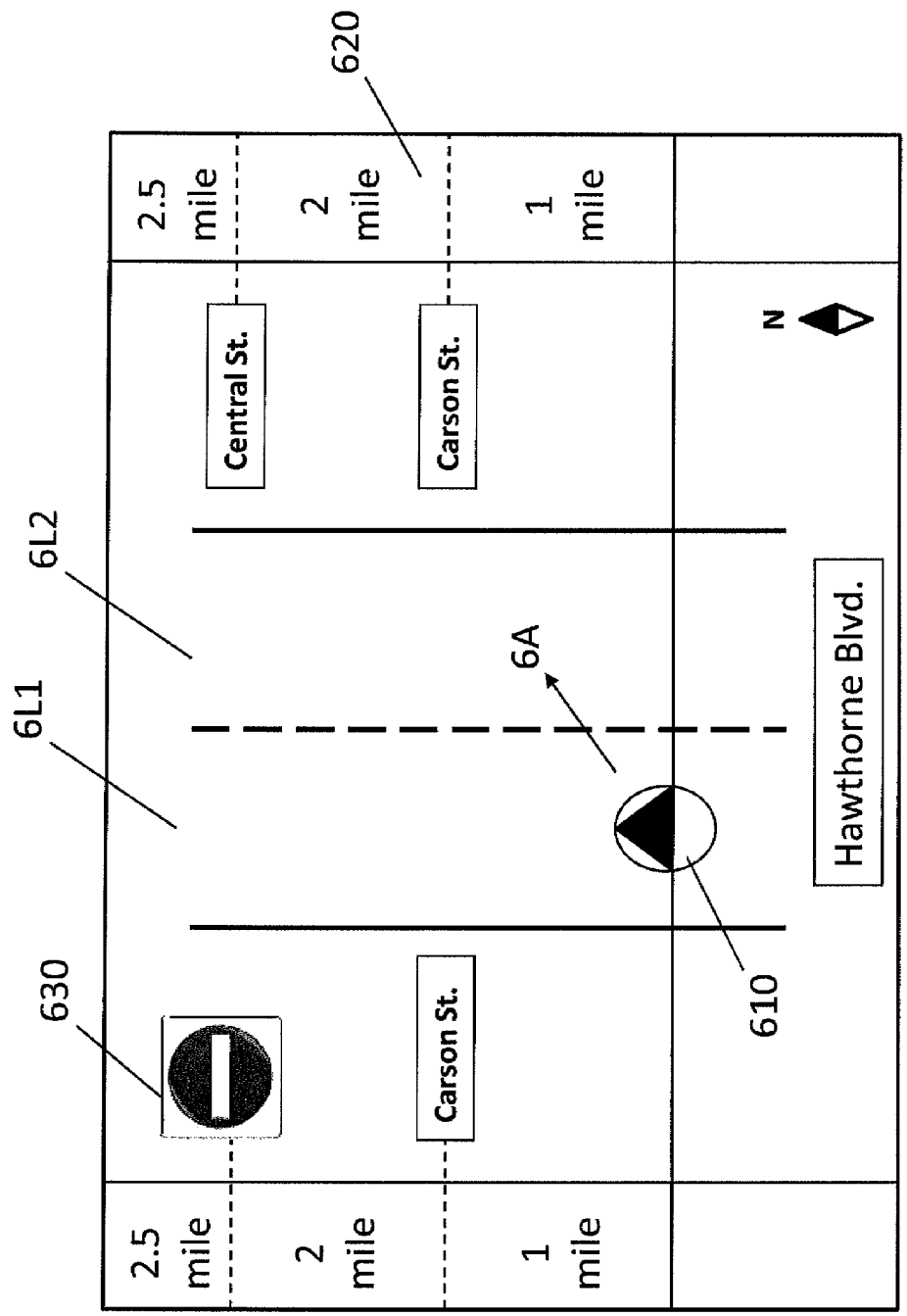
FIGS. 6 and 6a illustrate one embodiment in the present invention in which when the vehicle makes lane changes on a surface street, the navigation system may not recalculate the route.

In another embodiment, the guidance system can be implemented when the vehicle is traveling on local streets. As shown in FIG. 6, a vehicle 610 is currently on lane 6L1 on Hawthorne Blvd, which has two lanes 6L1 and 6L2. A distance indicator 620 on both sides of the user interface provides information about distance from the vehicle's current position to nearby streets. For example, from the vehicle's current position, it is one mile away to Carson St., and two miles away to Central St. A turn restriction sign 630 may be shown on the user interface if the street, e.g. Central St, only allows one-way traffic. More particularly, the CPU 414 may detect the vehicle's current position through the position measuring device 402 and retrieve the map data from the map information memory 407 to enable the distance indicator 620 to display the distances, etc.

Figure 6A:
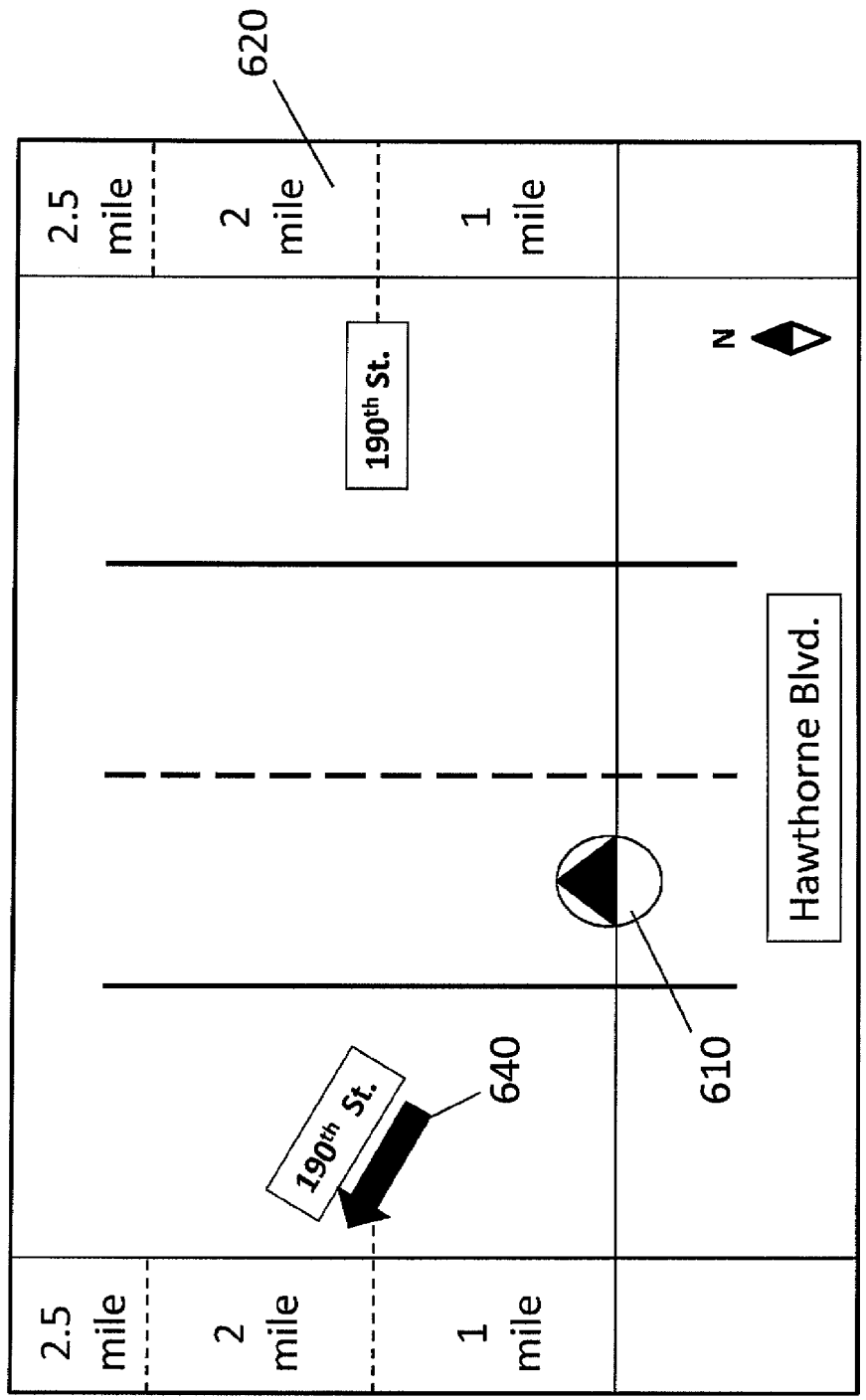

Similarly, when the vehicle 610 makes lane change to lane 6L2 (toward direction 6A), the guidance system in the present invention may not recalculate the route if the vehicle is still staying on Hawthorne Blvd. In one embodiment, the position measuring device 402 may be communicatively coupled with the guidance providing unit 403 and the route generating unit 421 through the bus 411, such that when the CPU 414 receives lane change information from the position measuring device 402, the CPU 414 may instruct the route generating unit 421 not to recalculate the route. As illustrated in FIG. 6a, when a turn is necessary, the road sign ($190^{th}$ St) along with a turn arrow 640 may be shown on the user interface.

Figure 6B:
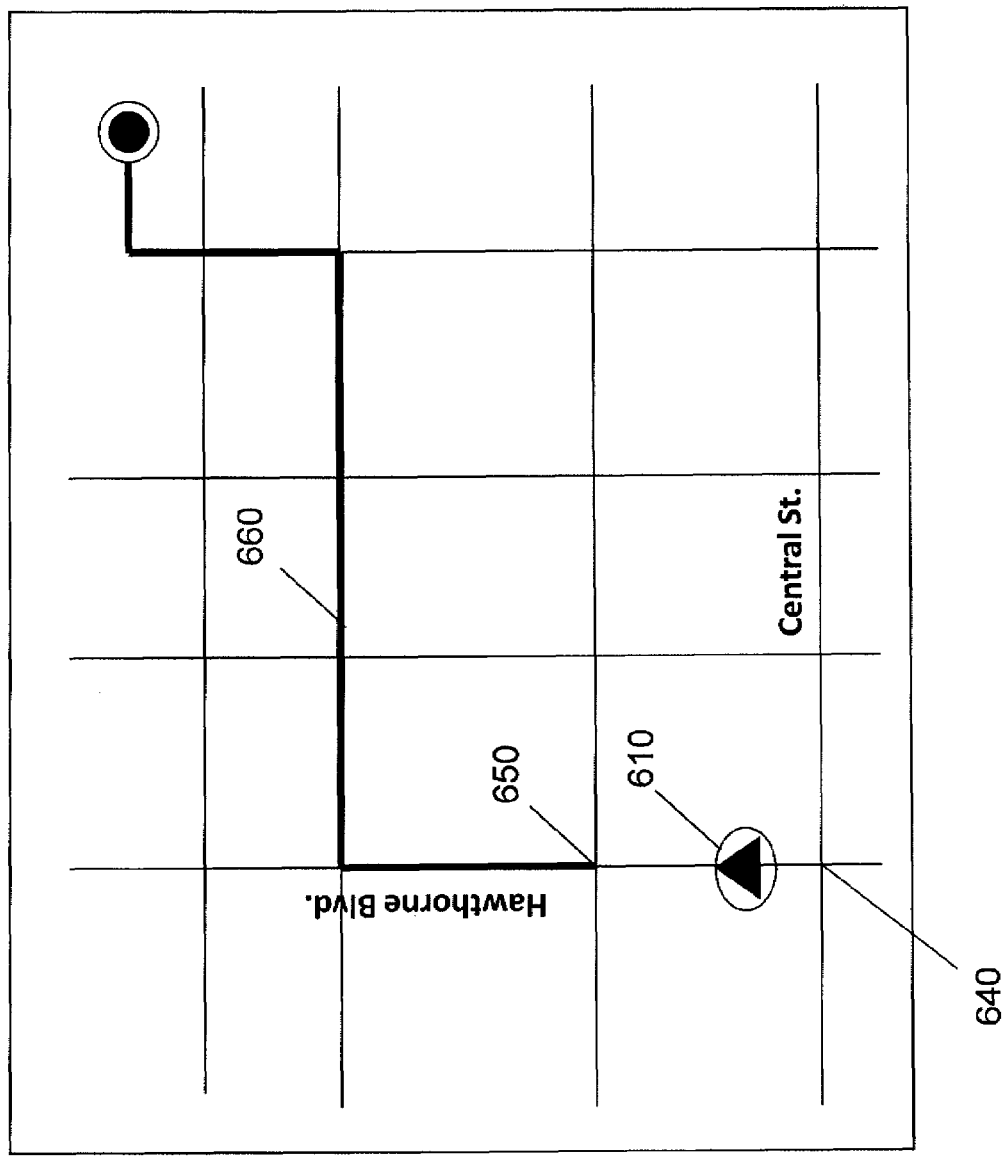
FIG. 6b depicts one embodiment in the present invention when the navigation system switches the routeless guidance to normal route guidance.

In the above example shown in FIGS. 5-6 and 6a, a route to the destination is not displayed on the user interface, i.e., routeless guidance. In an exemplary embodiment, such a routeless navigation mode may be switched to a regular route guidance mode if the navigation system 400 determines that the driver may not be familiar with certain geographical area before the destination. As can be seen FIGS. 6 and 6b, if the navigation system 400 determines that the driver may be unfamiliar with the area after a point 640 (intersection of Hawthrone Bl. and Central St.), the routeless navigation mode in FIG. 6 may be switched to the normal route guidance mode in FIG. 6b, and a route 660 can be provided as soon as the vehicle reach a next intersection 650. In a different embodiment, the routeless guidance and normal route guidance can be manually interchanged.

Figure 7:
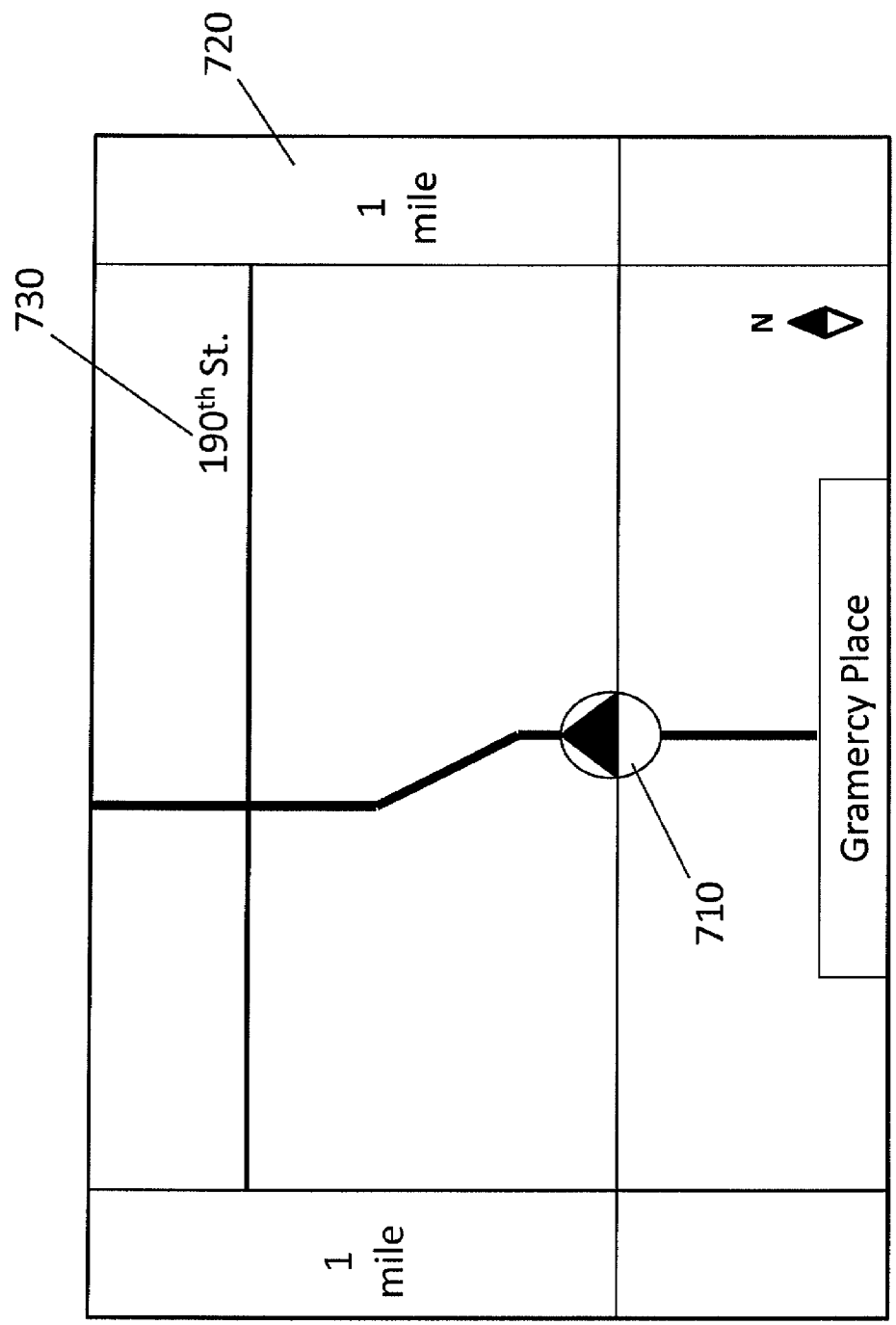
FIG. 7 illustrates another embodiment of the present invention in which when the guidance information is lacking, the guidance view may transform to a map view.

In the geographic database, it is possible that not all street links include lane counts and information. When the guidance information with respect to lanes is lacking, the guidance view shown in FIGS. 5, 6 and 6a may transform to a regular map view as depicted in FIG. 7, wherein a vehicle (710)'s current position, a distance indicator 720 and a nearby street 730 may be displayed on the user interface.

According to another aspect illustrated in FIG. 8, a guidance display method comprises the steps of: detecting a vehicle's current position 810; storing maps and road networks, including lane data 820; providing guidance information to the vehicle driver 830; and displaying the current position of the vehicle and the guidance information 840, in which a user interface displays the guidance information and the vehicle's current position matching with the maps and road networks, without displaying a route to the destination.

In one embodiment, the step of providing guidance information 830 comprises a step of providing guidance information on a lane basis. In another embodiment, the step of providing guidance information 830 comprises a step of providing a distance indicator which provides distance information from the vehicle's current position to nearby freeway junctions of nearby streets.

In some embodiments, the guidance display method may further include a step of generating a route, and the step of detecting a vehicle's current position 810 comprises a step of detecting route deviation of the vehicle to detect whether the vehicle deviates from a route to a predetermined extent, in which when the step for detecting route deviation indicates that the vehicle does not deviate from the route to a predetermined extent, the step for generating a route is not triggered to recalculate and generate a new route.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A navigation system comprising:
    means for detecting a vehicle's current position, including lane basis information;
    means for storing maps and road networks, including lane data;
    means for providing guidance information on lane basis to the vehicle driver, communicatively coupled with the means for storing maps and road networks and the means for detecting the vehicle's current position;
    means for generating a route, communicatively coupled with the means for providing guidance information through a bus; and
    means for displaying the current position of the vehicle and the guidance information,
    wherein the means for providing guidance information is configured to match the vehicle's current position with the maps and road networks on lane basis;
    wherein the guidance information without a route is displayed when the vehicle is travelling on a road with multiple lanes, the guidance information including the road networks associated with another lane different from the lane which the vehicle is travelling on,
    wherein the guidance information without route is displayed with additional information as guide option icons,
    wherein the additional information comprises distance and complexity flags, and wherein the factor to determine the complexity includes: freeway junction counts to destination, local street turn counts to destination, local street left turn versus right turn counts, and street and freeway junction counts.

2. The navigation system of claim 1,
    wherein the means for providing guidance information is configured to send an instruction not to recalculate the route to the means for generating a route, upon receipt of lane change information from the means for detecting a vehicle's current position, when the means for detecting route deviation indicates that the vehicle does not deviate from the route to a predetermined extent and is still travelling on the same route.

3. The navigation system of claim 2, wherein the means for providing guidance information includes a lane number determining unit to determine number of lanes according to the lane data stored in a database.

4. The navigation system of claim 2, wherein the guidance information includes a distance indicator which provides distance information from the vehicle's current position to nearby freeway junctions of nearby streets.

5. The navigation system of claim 2, wherein the means for providing guidance information further includes a link determining unit to traverse all accessible road links from the vehicle's current position.

6. The navigation system of claim 2, wherein the means for detecting a vehicle's current position further comprises means for detecting route deviation of the vehicle to detect whether the vehicle deviates from a route to a predetermined extent.

7. The navigation system of claim 1, further comprising means for detecting a lane change of the vehicle.

8. A guidance display method, comprising the following steps of:
    detecting a vehicle's current position, including lane basis information;
    storing maps and road networks, including lane data;
    providing guidance information to the vehicle driver on a lane basis; and displaying the current position of the vehicle and the guidance information, wherein a user interface displays the guidance information and the vehicle's current position matching with the maps and road networks, without a route, wherein the guidance information without route is displayed with additional information as guide option icons,
    wherein the additional information comprises distance and complexity flags, and wherein the factor to determine the complexity includes: freeway junction counts to destination, local street turn counts to destination, local street left turn versus right turn counts, and street and freeway junction counts.

9. The guidance display method of claim 8,
    wherein the step of providing the guidance information includes a step of sending an instruction not to recalculate the route, upon receipt of lane change information based on the step of detecting the vehicle's current position, when the step for detecting route deviation indicates that the vehicle does not deviate from the route to a predetermined extent and is still travelling on the same route.

10. The guidance display method of claim 9, wherein the step of providing guidance information comprises the step of determining number of lanes according to the lane data stored in a database.

11. The guidance display method of claim 9, wherein the step of providing guidance information comprises the step of providing a distance indicator which provides distance information from the vehicle's current position to nearby freeway junctions of nearby streets.

12. The guidance display method of claim 9 further comprises the step of generating a route.

13. The guidance display method of claim 12, wherein the step of detecting a vehicle's current position comprises a step of detecting route deviation of the vehicle to detect whether the vehicle deviates from a route to a predetermined extent.

14. The guidance display method of claim 9, further comprising a step of detecting a lane change of the vehicle.

15. A display apparatus for a navigation system comprising:
    a user interface;
    a vehicle position detecting unit to detect a vehicle's current position;
    at least one database to store and provide maps and road networks, including lane data; and
    a guidance providing unit to provide guidance information to a driver on a lane basis,
    wherein the guidance providing unit is communicatively coupled with the database and the vehicle position detecting unit to match the vehicle's current position with the lane data and display such information on the user interface without a route,
    wherein the guidance information without route is displayed with additional information as guide option icons,
    wherein the additional information comprises distance and complexity flags, and wherein the factor to determine the complexity includes: freeway junction counts to destination, local street turn counts to destination, local street left turn versus right turn counts, and street and freeway junction counts.

16. The display apparatus of claim 15,
    wherein the guidance providing unit sends an instruction not to recalculate the route, upon receipt of lane change information from the vehicle position detecting unit, when the route deviation detecting unit indicates that the vehicle does not deviate from the route to a predetermined extent and is still travelling on the same route.

17. The display apparatus of claim 16, wherein said guidance providing unit includes a lane number determining unit to determine number of lanes according to the lane data stored in a database.

18. The display apparatus of claim 16, wherein said guidance providing unit comprises a distance indicator which provides distance information from the driver's current position to nearby freeway junctions of nearby streets.

19. The display apparatus of claim 16 further comprises a route generating unit.

20. The display apparatus of claim 19, wherein the vehicle position detecting unit further comprises a route deviation detecting unit to detect whether the vehicle deviates from a route to a predetermined extent.

21. The display apparatus of claim 16, further comprising a lane change detection unit to detect a lane change of the vehicle.

* * * * *